Dec. 1, 1964    D. WALDMAN    3,158,934
ORTHODONTIC APPLIANCES

Filed Feb. 21, 1961    2 Sheets-Sheet 1

INVENTOR.
Dr. David Waldman
BY Howard B. Russell
his ATTORNEY

United States Patent Office 3,158,934
Patented Dec. 1, 1964

3,158,934
ORTHODONTIC APPLIANCES
David Waldman, 176—17 69th Ave., Flushing, N.Y.
Filed Feb. 21, 1961, Ser. No. 90,767
2 Claims. (Cl. 32—14)

This invention relates to improvements in orthodontic appliances designed to be attached to an arch wire and employed for the purpose of exerting a corrective force on certain teeth in order to correct the position of the teeth in relation to others. Such appliances are commonly called a "stop."

The force exerted on the teeth is generally a resilient force and may be exerted by an elastic band, a helical spring, an omega type spring, the resiliency of the arch wire itself, or in other ways. In the progress of the corrective work it is necessary to adjust the magnitude and/or direction of the corrective force from time to time, and it is desirable to accomplish this quickly and positively without danger of loss of parts or changes in the desired adjustment during tightening of the stop.

It has been proposed to provide arch wire appliances of the general class to which the invention is directed with a set screw for the purpose of clamping the appliance in the desired position. The set screw is quite small and considerable difficulties are experienced in fitting arch wire into the respective channel of the stop, or fitting the stop over the arch wire and then tightening the assembly without loss of the set screw to be fitted into the tapped hole in the appliance. A known form of stop requires removal and reinsertion of the set screw which is a difficult procedure because of the small size of the screw and is aggravated if the screw must be inserted against a force exerted by the arch wire in the opposite direction. Loss of the set screw under these circumstances is a not uncommon occurrence.

Another known form of stop comprises a substantially vertical set screw which is difficult to tighten and loosen because the wrench must be removed and reapplied after only a fraction of a turn. This is a time consuming procedure involving the danger of shifting of the stop from its proper position during the tightening.

Still another known form of appliance employs the rotary wedge principle for tightening. This involves the disadvantage that the arch wire must be of a definite gauge and shape and the further disadvantage that complete loosening occurs within a rotation of less than 45 degrees of the rotary wedge.

The invention provides an improved stop which may readily be slipped over the arch wire irrespective of shape, gauge and degree of straightness of the wire, a stop which requires neither assembly for tightening nor disassembly for removal, but is preassembled and easy to tighten by conventional tools or even by means of a variety of dentists' instruments fitting the slot of a screw. Stops incorporating the present invention are universal in the sense that they may be fitted with hooks, arms, integral springs such as omega springs, may be used singly, or in pairs, on one or on opposite arch wires, as will also be apparent from the following description and examples of various forms of uses.

The various objects, features and advantages of this invention will appear more fully from the detailed description which follows accompanied by drawings showing, for the purpose of illustration, embodiments of this invention. The invention also resides in certain new and original features of construction and combination of elements hereinafter set forth and claimed.

Although the characteristics features of this invention which are believed to be novel will be particularly pointed out in the claims appended hereto, the invention itself, its objects and advantages, and the manner in which it may be carried out may be better understood by referring to the following description taken in connection with the accompanying drawings forming a part of it in which:

Figure 1:
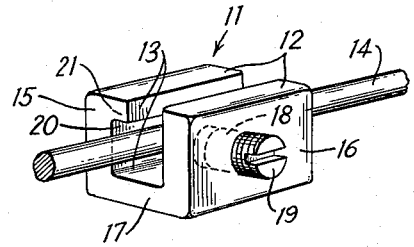
FIGS. 1 and 2 are perspective views of preferred forms of stops embodying the invention.

In the following description and in the claims various details will be identified by specific names for convenience. The names, however, are intended to be generic in their application. Corresponding reference characters refer to corresponding parts in the several figures of the drawings.

The drawings accompanying, and forming part of, this specification disclose certain specific details of construction for the purpose of explanation of broader aspects of the invention, but it is understood that structural details may be modified in various respects without departure from the principles of the invention and that the invention may be incorporated in other structural forms than shown.

The stop 11 comprises a body 12 preferably of metal having a vertical slot 13 extending into it adapted to receive an arch wire 14. The slot divides the block on body 12 into a rear portion 15, a front portion 16 and a bight portion 17 connecting the rear and front portions. The front portion 16 is tapped at 18 preferably centrally and a set screw 19 extends through the tapped hole in order to clamp the arch wire 14 against the rear wall 20 of the vertical slot. A lip 21 may be provided overhanging the lower portion of the vertical slot to facilitate application of the stop to the wire 14 by hooking it over the wire.

The body may readily be manufactured from extruded or drawn bar stock, cut to length, drilled, tapped, and then tumbled to round exterior edges and corners. For convenience in manufacture the hole 18 may extend through both the front portion 16 and the rear portion 15 to provide extra room for the tap.

Figure 2:
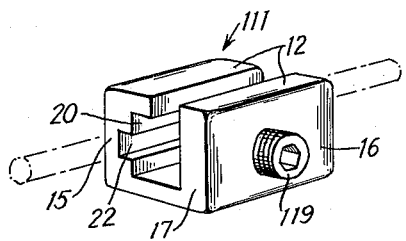

The stop 111 shown in FIG. 2 corresponds in general shape to that shown in FIG. 1 except for a transverse groove 22 in the rear wall for central seating of the arch wire opposite the set screw 119 which is shown to be of the Allen type.

The stop is readily assembled with the arch wire by first sufficiently unscrewing the set screw, without complete removal of the set screw, so that the arch wire can be inserted into the vertical slot 13. Partial tightening of the set screw makes it impossible for the stop to be disengaged from the wire, while yet permitting longitudinal adjustment prior to complete tightening of the set screw. The screwdriver, Allen wrench or other tool may easily be spun through several revolutions for complete tightening or removal. Use of an Allen set screw makes it unnecessary to handle the stop body since the entire stop may be installed while on the tip of the wrench.

The illustrated configuration of the rear portion 15 of the body facilitates partial installation sufficiently tight to prevent disengagement while sufficiently free for lateral adjustment.

Figure 3A:
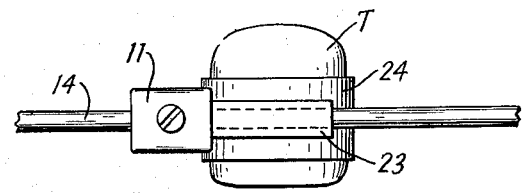
FIGS. 3a and 3b are elevational and plan views, respectively, of a stop on an arch wire passing through a molar tube.
Figure 3B:
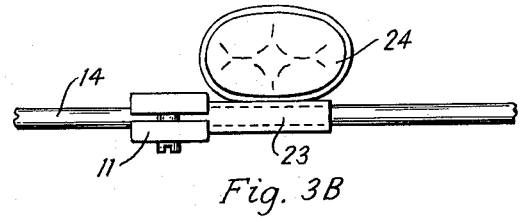

FIGS. 3a and 3b illustrate the use of the stop on an arch wire 14, the stop bearing against the end of a molar tube 23 on a band 24. As a result the molar tube is urged to the right.

Figure 4:
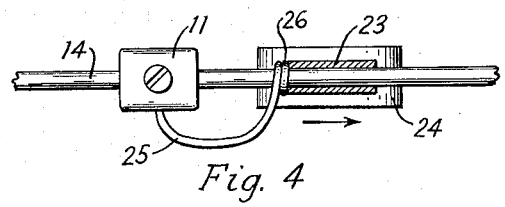
FIG. 4 shows a stop with an integral U-spring bearing against a tube.

FIG. 4 shows the stop to which a U spring 25 is secured bearing against a molar tube. In the illustrated example the end 26 of the spring forms two loose turns about the wire 14 and urges the tube in the direction of the arrow.

Figure 5:
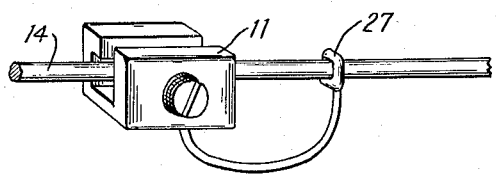
FIG. 5 is a perspective view of a stop with an integral U-spring having a claw type end portion for exerting a pulling or pushing force.

The U spring of the stop shown in FIG. 5 has a claw type end which may exert a force to the right or to the left, as desired.

Figure 6:
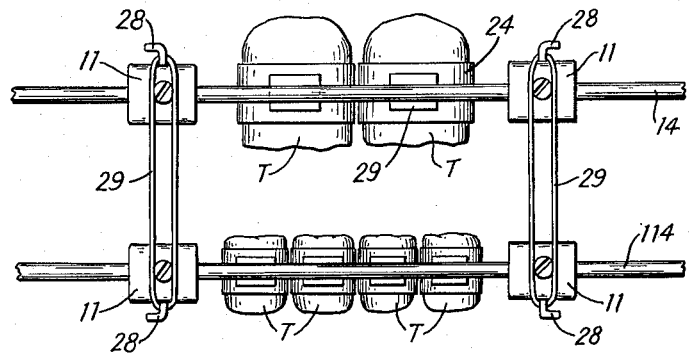
FIG. 6 is an elevational view of an arch wire and stop assembly with elastic bands acting between two arch wires.

The stops 11 shown in FIG. 6 are fitted with arms 28 about which elastic bands 29 are trained to urge the arch wires 14 and 114 together. The teeth T between the stops 11 are fitted with bands 24 and brackets 29 which engage the arch wires.

Figure 7:
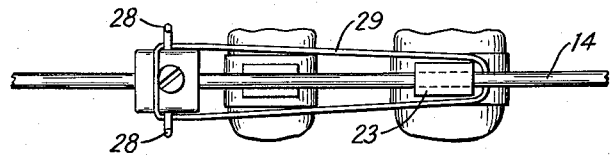
FIG. 7 is an elevational view of an assembly for exerting a pulling force between a stop fitted with T-arms and a tube mounted on a band.

The stop shown in FIG. 7 has two straight arms 28 from which an elastic band 29 extends to a molar tube. The band 29 may of course be replaced by a helical spring.

Figure 8:
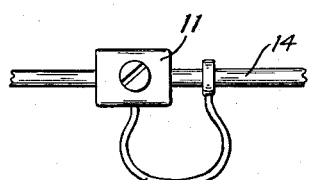
FIGS. 8 and 9 are elevational views of stops used in connection with an omega and helical spring, respectively.
Figure 9:
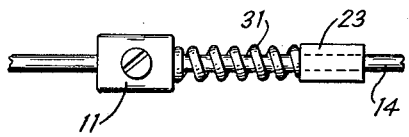
Figure 10:
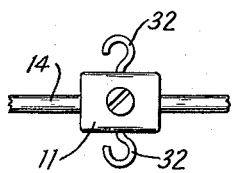
FIG. 10 is an elevational view of a stop fitted with double hooks.

FIG. 8 shows the stop 11 having a typical omega spring 30 attached thereto, for example by brazing. FIG. 9 shows a helical spring 31 between a tube 23 and the stop. FIG. 10 shows the stop with twin hooks 32.

Many other uses of the appliance will readily suggest themselves to the practitioner on the basis of the foregoing description which indicates that the number of combinations of the appliance with springs, tubes, bands, arch wires, is very great.

What is claimed is:
1. An orthodontic appliance for use with an arch wire, the appliance comprising a metal block having a vertical slot extending into it adapted to receive an arch wire, said slot subdividing said block into a rear portion, a front portion, and a bight portion connecting said rear portion and said front portion, the front portion having a tapped hole therethrough; a set screw in said hole for clamping an arch wire against said rear portion; and an arm secured to said block, said arm having a free end and extending outwardly in a general direction away from said tapped hole and in a plane substantially normal to the axis of said tapped hole.

2. An orthodontic appliance for use with an arch wire, the appliance comprising a metal block having a vertical slot extending into it adapted to receive an arch wire, said slot subdividing said block into a rear portion, a front portion, and a bight portion connecting said rear portion and said front portion, the front portion having a tapped hole therethrough; a set screw in said hole for clamping an arch wire against said rear portion; and a loop spring secured to said block, said spring extending outwardly from said block substantially in a plane normal to the axis of said tapped hole.

References Cited by the Examiner
UNITED STATES PATENTS

| 1,044,764 | 11/12 | Federspiel | 32—14 |
| 2,236,042 | 4/36 | Terwilliger | 32—14 |
| 2,502,902 | 4/50 | Tofflemire | 32—14 X |

FOREIGN PATENTS 623,406  12/35  Germany.

RICHARD A. GAUDET, Primary Examiner.
ROBERT E. MORGAN, RICHARD J. HOFFMAN, Examiners.